United States Patent [19]

Nolte et al.

[11] Patent Number: 5,027,674
[45] Date of Patent: Jul. 2, 1991

[54] STEERING COLUMN FOR MOTOR VEHICLES WITH A SHAFT MOVABLE IN THE AXLE DIRECTION

[75] Inventors: Frank Nolte, Osnabruck; Norbert Bauch, Eydelstedt, both of Fed. Rep. of Germany

[73] Assignee: Lemförder Metallwaren AG, Lemförder, Fed. Rep. of Germany

[21] Appl. No.: 428,171

[22] Filed: Oct. 27, 1989

[30] Foreign Application Priority Data

Nov. 2, 1988 [DE] Fed. Rep. of Germany ....... 3837190

[51] Int. Cl.⁵ .......................... B62D 1/18; G05G 5/18
[52] U.S. Cl. ......................................... 74/493; 74/527; 74/577 M; 188/67; 403/108; 403/109; 403/322; 403/327; 403/330
[58] Field of Search ............... 74/493, 527, 577 M; 188/67, 69; 280/775; 403/108, 109, 322, 327, 330

[56] References Cited

U.S. PATENT DOCUMENTS

| | | | |
|---|---|---|---|
| 595,556 | 12/1897 | Buffum | 74/577 M |
| 1,225,289 | 5/1917 | Twombly | 74/493 |
| 2,825,426 | 3/1958 | Baxter, Jr. | 188/69 |
| 2,887,929 | 5/1959 | Farmer | 403/109 X |
| 3,316,774 | 5/1967 | Vogelgesang | 403/327 X |
| 3,714,843 | 2/1973 | Bracey | 74/527 |
| 4,424,721 | 1/1984 | Deacon | 74/493 |

Primary Examiner—Allan D. Hermann
Attorney, Agent, or Firm—McGlew & Tuttle, P.C.

[57] ABSTRACT

A steering column for motor vehicles with a steering shaft that is movable in the axle direction and held by a positive connection notching. The notching is formed between a jacket barrel (1) placed so that it is fixed from turning, and a solid body thrust bearing (2) and consists of toothed gearing segments (4, 5) on the width of the jacket barrel (1) and anchored toothed elements (6, 7) that are movable on the thrust bearing (2) with at least a gear tooth (9, 10). Wedge bodies (11, 12) are provided that by means of a control are movable in the bolt position brought about by the notching. The gearing tooth portions on the jacket barrel (1) include at least two segments (4, 5) developed with the same tooth spacing, that nevertheless are arranged around a half gear segment displaced with respect to each other. In addition, each segment is adjoined around a traverse axis (8) movable placed notch element (6, 7) whose gear teeth are spaced a distance from each other in the axle direction of the jacket barrel (1) that corresponds to a direct multiple of the spacing of the toothed gear segment.

4 Claims, 2 Drawing Sheets

STEERING COLUMN FOR MOTOR VEHICLES WITH A SHAFT MOVABLE IN THE AXLE DIRECTION

FIELD OF THE INVENTION

The invention concerns a steering column for motor vehicles with a steering shaft that is movable in the axle direction in which a positive connection notching is provided between an axially movable jacket barrel, which is fixed from turning and a solid body thrust bearing.

BACKGROUND OF THE INVENTION

In the past, it has been proposed to provide such a steering arrangement with a positive connection notching of the movable parts in one of the solid body thrust bearings with a gear element, provided mostly on the movable part. Such an arrangement includes a control mechanism cooperating with notches notches of a bolt position of a spring loaded movable notch element, which has at least a cog wheel element, and also more cogs. The positively connected notchings of the interlocking gears on the axial parts that move against each other are only adjustable in their final position. This arrangement provides the advantage that the notched bolting device can transmit great power in the axial direction, power that with a friction clamp would eventually lead to a sliding through or disengagement. Positive connection notchings are known to be favored from this standpoint to accommodate a crash force acting on the steering column.

A substantial disadvantage of such a positive connection notching is nevertheless the "head on head" position of the interlocking gear tooth elements on both of the parts that unavoidably move against each other in an axial direction. Unaided by the performance of the sharp gear tooth tops, it is inevitable that such a position in the bolting device cannot be guaranteed. In such a case a bolting device with a definite positioning is achieved only through renewed pressure on the movable part (for example, on the steering wheel). Accordingly, with such a device, negative effects (including the possibility of a head on head tooth positioning) result that are unacceptable with regard to safety in a motor vehicle. With such a bolting device, a newly placed position of a traverse with a half segment of the gear on the notching element will occur, suggesting free motion for the driver of the motor vehicle. This could appear as a defective function. The head on head tooth position can lead to a slipping through of the gearing with a crash occurring adjacent the arrangement. This is due to the inertia of all the structural elements concerned with the engagement as no appreciable traverse movement to the bolting device occurs.

SUMMARY AND OBJECTS OF THE INVENTION

It is an object of the invention to develop a positive connection notching with characteristics of the type that a positive connection tooth engagement can also be achieved with a head on head tooth position of the individual gear elements.

According to the invention, an axially movable jacket barrel is fixed against rotation and is provided with a first rack toothed segment and a second rack toothed segment, the first rack toothed segment having a teeth offset by one-half tooth width with respect to the teeth of the second rack toothed segment. A thrust bearing assembly is provided including a solid body thrust bearing. A first pawl toothed element and a second pawl toothed element are provided connected to the solid body thrust bearing by an axle extending substantially transverse to the jacket barrel such that each of the toothed elements is movable toward and away from a corresponding first and second toothed gear segment. Means are provided for maintaining the first and second pawl toothed elements biased in the direction of a corresponding first and second rack toothed segment. Engagement and disengagement means is provided selectively disengaging the bias of the first and second toothed element so as to allow disengagement of the first and second pawl toothed element from a corresponding first and second rack toothed segment.

The arrangement according to the invention leads to a more secure tooth engagement in each arbitrary position. Between the limit positions, either a notch or toothed segment is fully engaged or the gear of another notch segment is fully engaged with the tooth tops on the tooth of the accompanying section that lies on the jacket barrel. With this arrangement, an endless number of intermediate positions are possible. In such positions the gears of both notch segments grip more or less deep in the gearing on the jacket barrel and support themselves on the gear flanks, whereby this support occurs in both segments on the facing gear flanks. If the gearing of a notch element also provides itself with the left flank on the gearing on the jacket barrel, then the gearing of the other gear element supports itself with the right flank on the gearing of the accompanying section on the jacket barrel.

The arrangement advantageously provides a back wedging of the notch elements through two wedges with a self-locking angle, through which these wedges are loaded in the direction of the notch position through a spring supporting itself against both wedge bodies. This provides a bolting device of the movable parts that move axially against each other without a noticeable segmentation.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
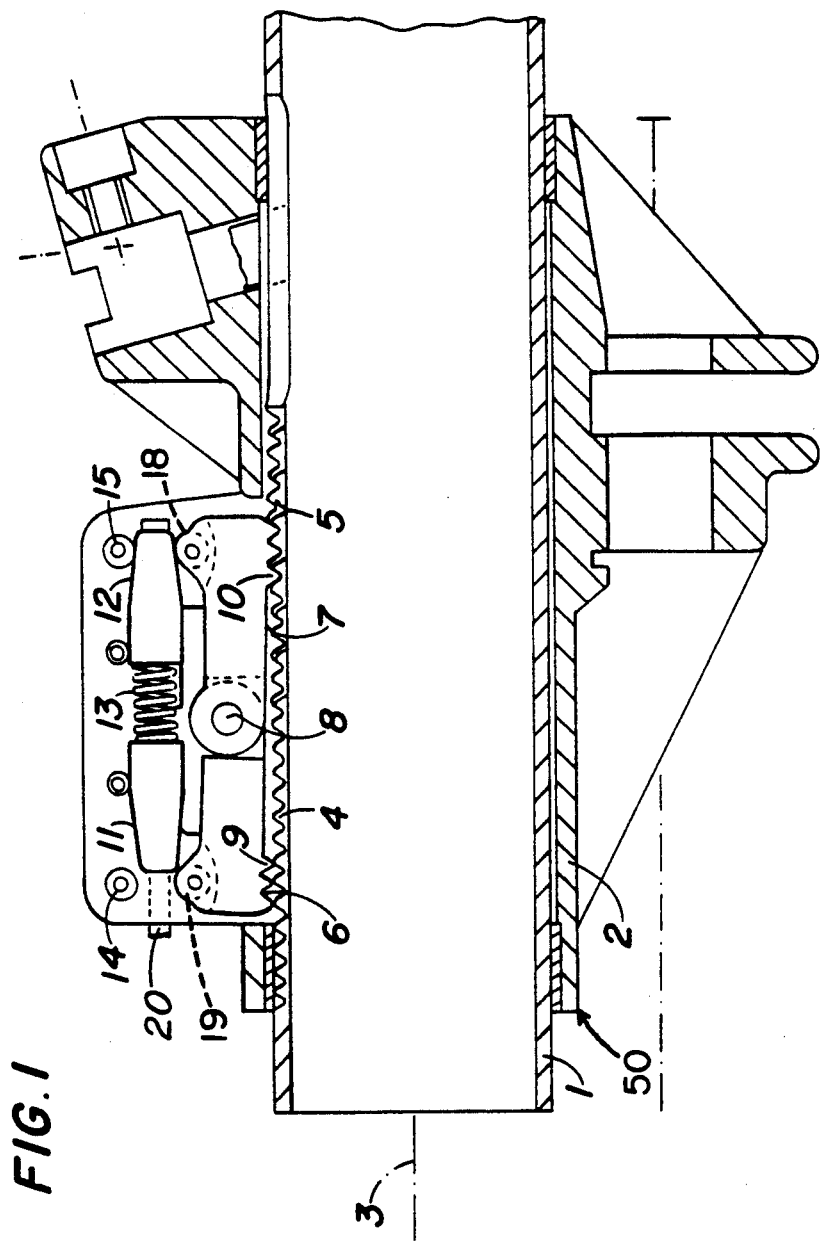
FIG. 1 is a longitudinal sectional view taken in an axial plane through an embodiment of the invention.

Referring to the drawings in particular, the invention embodied therein comprises a steering column arrangement with an axially movable jacket barrel 1 which is fixed against rotation. The axially movable jacket barrel 1 includes a first rack toothed segment 4 and a second rack toothed segment 5. The first toothed segment 4 has teeth offset by one-half tooth width, with respect to the teeth of the second rack toothed gear segment 5. A thrust bearing assembly generally designated 50 is provided including a solid body thrust bearing tube 2, a first pawl toothed element 6 and a second pawl toothed element 7. Each of the pawl toothed elements (6 and 7) is connected to the solid body thrust bearing 2 by an axle (in the embodiments shown by a single axle 8). The axle 8 extends substantially transverse to the jacket barrel 1 such that each of the pawl toothed elements 6, 7 is movable toward and away from a corresponding first and second rack toothed segment 4, 5. Engagement, disengagement means 11-12 is provided for maintaining the first and second pawl toothed elements 6, 7 biased in the direction of a corresponding first and second rack toothed gear segment 4, 5. The engage, disengagement means 11-12 also selectively disengages the bias of the first and second pawl toothed elements 6, 7 such that they may be disengaged from the corresponding first and second rack toothed segments 4, 5.

The jacket barrel 1 is arranged so that it cannot turn, which in the solid body thrust bearing 2 is movable in the axial direction with respect to central axis 3. For the bolting device of the adjusted position of jacket barrel 1 opposite thrust bearing 2, the rack toothed segments 4 and 5 is provided on a subsection of the range of jacket barrel 1. Both rack toothed segments 4 and 5 include a gearing in the same segmentation, but are arranged a half gear section removed from each other with respect to the axial direction. Each rack toothed segment 4 and 5 is adapted to engage the notch or pawl toothed element 6 and 7 respectively. The elements 6, 7 are movable with respect to a common axle 8, which lies diagonal to axle 3. Each notch or pawl tooth element 6 and 7 respectively, includes at least a cog or pawl tooth 9 and 10 respectively. More cogs with a segment corresponding to the rack toothed segments 4 and 5 may be provided in which the distance of the cogs 9 and 10 still corresponds to a straight multiple of the rack toothed section 4 and 5. On the exterior both pawl toothed elements 6 and 7 operate together with wedge bodies 11 and 12, whose wedge angle has a self-locking tendency and are loaded in the direction of the bolting device position through spring 13, which both supports itself against wedge body 11 and against wedge body 12. Both wedge bodies 11 and 12 are pressable against each other by overcoming the power of spring 13 through a control mechanism 20 (not shown in detail) so that they make possible a swivel movement of the notch or pawl toothed elements 6 and 7 around axle 8. For the reduction of the friction between the notch elements 6 and 7 on one hand and the wedge bodies 11 and 12 on the other hand the notch element rollers 18, 19 or other means of reducing friction can be provided for. The representation in FIG. 1 shows a threshold position, by which the cogs or pawl teeth 9 of a or pawl toothed element 6 finds itself in a "head on head" position with the gearing in segment 4 on jacket barrel 1. Through the removal of both rack toothed segments 4 and 5 in the axial direction around a half gear section the teeth other notch 10 on other notch or pawl toothed element 7, grip at least partially, in the rack teeth of rack toothed segment 5. The teeth 9 engaging rack teeth of segment 4 entails a "head on head" position between rack teeth or segment 7 and pawl teeth 10, so that a tooth engagement for the attainment of a positive connection notching will always be attained.

Figure 2:
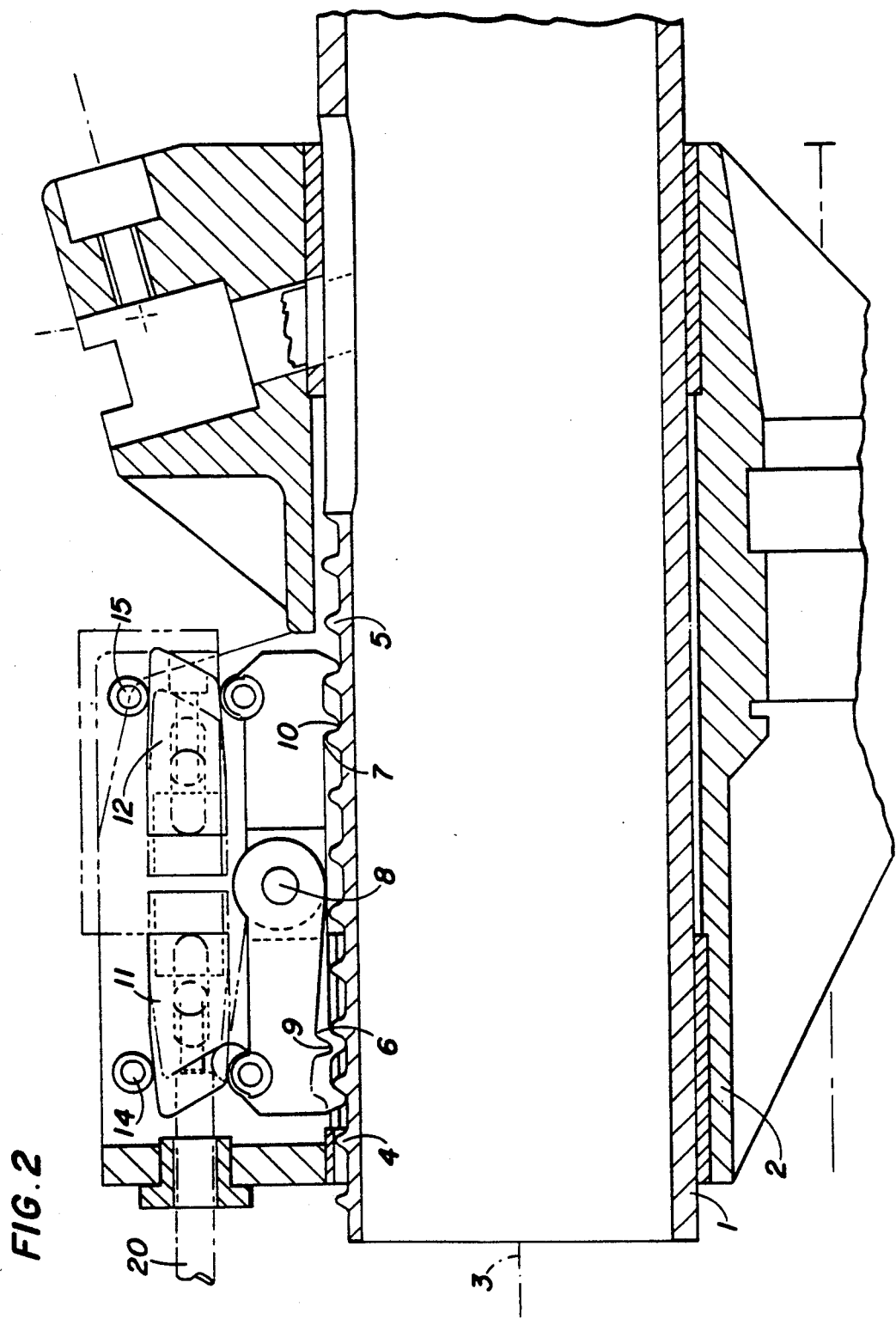
FIG. 2 is an enlarged view of a longitudinal section facing FIG. 1 in an axial plane of a modified embodiment of the invention.

The construction example in FIG. 2 shows an embodiment viewed as in FIG. 1, in which every second cog or rack tooth on the segments 4 and 5 respectively and of the pawl teeth 9 and 10 on or pawl toothed elements 6 and 7 is missing. From this the limit positions are shown, by which the gearing 10 of a notch element 7 is fully locked into position, in case the gearing 9 on the other notch element 6 situates itself in a "head on head" position with the facing gearing and is overturned. In between an infinite number of intermediate positions are possible. In these intermediate positions a complete flank support of the interlocking gearing regularly takes place. Except in the threshold position, of which one is represented in FIG. 2, in all the intermediate positions of a tooth flank movement of pawl teeth 9 and 10 takes place on the sides lying opposite, that is, by a flank movement of the pawl teeth 9 on the left side of a flank movement of pawl teeth 10 which 20 takes place on the right side. A development corresponding to the example in FIG. 2 is brought about, such that through the regularly complete tooth engagement of the rack toothed segments 4,5 at least of a tooth element, no great strain on the gear flanks occurs and a strength dimension with relative flatness on the tooth head and with a tooth equipped with a certain width is possible. Also by this construction example a back wedging of the notch elements 6 and 7 is provided for through wedge bodies 11 and 12, such that through a common control member in overcoming the force of a spring are pulled back towards each other to make possible a swivel movement around the pawl toothed elements 6 and 7 around axle 8. In the bolt position represented in the FIG. 2, the wedge rollers 11 and 12 grip behind on the notch elements 6 and 7, whereby they support themselves on the solidly arranged abutments 14 and 15 that are also shown in the embodiment of FIG. 1.

By a development in accordance with the example in FIG. 2, the teeth in the segments 4 and 5 can be arranged on the same gear segment because through the removal of every second cog or tooth a distance will be created, that is larger than the dimension of the removal corresponding to the example in FIG. 1.

While specific embodiments of the invention have been shown and described in detail to illustrate the application of the principles of the invention, it will be understood that the invention may be embodied otherwise without departing from such principles.

What is claimed is:

1. A steering column arrangement comprising:
   an axially movable jacket barrel fixed against rotation, having a first rack toothed segment and a second rack toothed segment, the first rack toothed segment having teeth offset by one-half tooth width with respect to the teeth of the second rack segment;
   a thrust bearing assembly including a solid body thrust bearing, a first toothed element and a second toothed element, each of said toothed elements being connected to said solid body thrust bearing by an axle, extending substantially transverse to said jacket barrel, such that each of the toothed elements is movable toward and away from a corresponding said first and second toothed gear segment; and,
   engagement and disengagement means for maintaining said first and second toothed elements biased in the direction of a corresponding said first and second toothed gear segment and for selectively disengaging said bias of said first and second toothed element.

2. A steering column according to claim 1, wherein said first and second toothed element are connected to said solid body thrust bearing by a common single axle, each of said toothed elements including a camming surface, said engagement and disengagement means including wedge camming elements and a spring said, spring biasing said wedge camming elements into engagement with a camming surface of a corresponding first and second toothed element, thereby biasing the first and second toothed element in the direction of a corresponding first and second toothed gear segment.

3. A steering column according to claim 1, wherein the spacing between teeth of the first and second toothed elements corresponds to a multiple of the spacing between teeth of the first and second toothed gear segments.

4. A steering column according to claim 3, wherein the spacing of the teeth of the toothed elements is double the spacing of the teeth of the toothed gear segments.

* * * * *